T. I. DUFFY.
SHOCK ABSORBER.
APPLICATION FILED SEPT. 3, 1915.
1,213,083.
Patented Jan. 16, 1917.
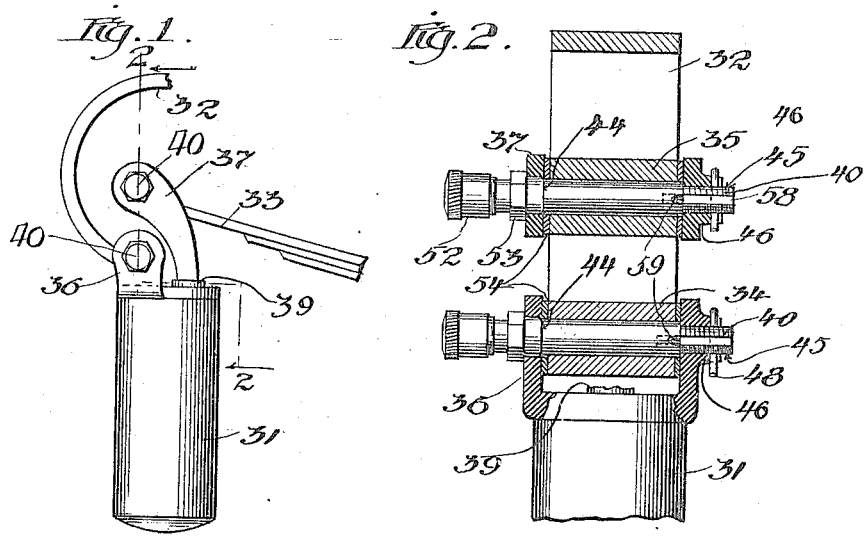
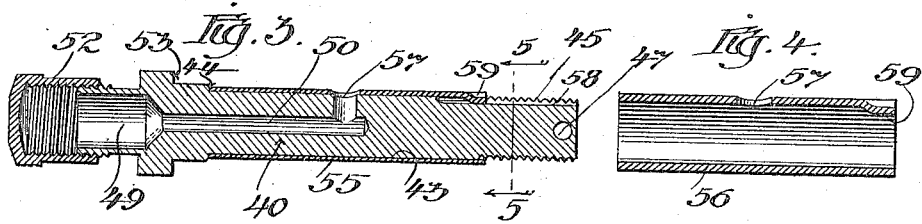
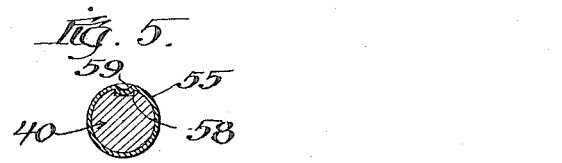
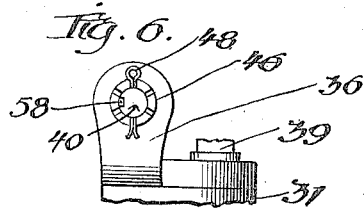
Witnesses:
Leonard E. Bogue
J. C. Higham
Inventor:
Thomas I. Duffy.
By William L. Hall,
Attorney.

UNITED STATES PATENT OFFICE.

THOMAS I. DUFFY, OF CHICAGO, ILLINOIS.

SHOCK-ABSORBER.

1,213,083.

Specification of Letters Patent.   Patented Jan. 16, 1917.

Application filed September 3, 1915.   Serial No. 48,787.

*To all whom it may concern:*

Be it known that I, THOMAS I. DUFFY, a citizen of the United States, and a resident of Chicago, in the county of Cook and State of Illinois, have invented certain new and useful Improvements in Shock-Absorbers; and I do hereby declare that the following is a full, clear, and exact description thereof, reference being had to the accompanying drawings, and to the characters of reference marked thereon, which form a part of this specification.

This invention relates to improvements in shock absorbers for vehicle springs, and refers more specifically to a novel universal adapter shackle bolt connection for connecting the shock absorber to the spring members or the spring member and hanger.

Among the objects of the invention is to provide a shackle bolt connection for this purpose which may be used as a universal connection to attach a shock absorber of given dimensions to springs or spring hangers of varying dimensions with respect to the width and diameter of the spring eyes, whereby an equipment embodying my invention may be applied to various standard dimensions of springs without the necessity of changing the springs or shock absorber by machine operations.

A further object of the invention is to provide an improved shackle bolt so arranged as to permit adapter bushings of varying external diameters to be interchangeably fitted thereto so as to adapt the compound shackle bolt to spring eyes or spring hanger eyes of varying diameters.

A further object of the invention is to provide means for securing such adapter bushings to the shackle bolt so as to maintain the same non-rotative thereon, and to effect and maintain registration of grease openings and passages in the bolt and bushing and to thereby provide an uninterrupted passage between the ordinary grease cup of the shackle bolt and the bearing surfaces formed on the exterior surfaces of the interchangeable bushings.

The invention consists in the combination and arrangement of parts shown in the drawings and described in the specification and more fully pointed out in the appended claims.

In the drawings:—Figure 1 is a side elevation of a shock absorber attached to a standard form of vehicle spring by means of a shackle bolt connection embodying my invention. Fig. 2 is a fragmentary vertical section on the line 2—2 of Fig. 1. Fig. 3 is an axial section of the shackle bolt and an adapter bushing. Fig. 4 is an axial section of one of the adapter bushings. Fig. 5 is a transverse section on the line 5—5 of Fig. 3. Fig. 6 is a detail view illustrating the manner of locking the shackle bolt to the shock absorber fitting.

In the drawings the shock absorber 31, of an approved type, is shown as attached to a form of vehicle spring which consists of an upper and a lower member 32, 33, respectively, the former of which is scrolled to extend beyond the lower member, and said members are provided with spring eyes 34, 35, respectively, to receive the shackle bolt. The said spring eyes fit between spaced lugs or yokes 36, 37, the latter of which is adapted to be connected to the shock absorber plunger 38 and the former of which is fixed rigidly to the shock absorber casing or frame. 40, 40 designate shackle bolts which extend through apertures in said lugs and through the spring eyes. It will be understood, however, that the invention is equally adaptable to forms of vehicle springs embodying a single spring member which is adapted to coöperate with a rigid spring fitting or hanger having an eye to receive one of the shackle bolts. The term spring eye used herein is, therefore, intended to be applied to both forms of springs.

The shackle bolt, shown best in Fig. 3, comprises a cylindric bearing portion 43 of a length to extend through the spring eye, a shoulder portion 44 at one end of the bearing portion which extends through and fits closely in a bearing opening of one of the attaching lugs and a screw thread 45 which engages a screw-threaded aperture in the other attaching lug at the opposite side of the shock absorber.

As a convenient means for locking the shackle bolt in place the lug into which the bolt is screw-threaded may be provided with an exterior thickened portion 46 which is notched in the manner of a castellated nut and the screw-threaded end of the bolt is provided with an aperture 47 to receive a cotter pin 48 which is adapted to be seated in opposing notches of the thickened portion 46.

The shackle bolt is provided with the usual grease cup 49 which communicates through an axial passage 50 and a lateral passage 51 with the bearing surface of the bolt. A cap 52 screw-threaded to the outer end of the bolt serves to hold a quantity of grease in the grease cup in the usual way.

The length of the bearing portion 43 of the bolt between the shouldered portion 44 and the screw-thread 45 is so related to the width between the attaching lugs 16 and 18 that the entire length of the bearing portion may be utilized for springs of a width to fill the space between said lugs. The bolt is provided exterior to the enlarged shouldered portion 44 with an inwardly facing shoulder 53 adapted to bear against the outer face of the adjacent attaching lug to fix the position of the bolt relatively to said lug, the screw-thread or other engagement with the other lug serving to hold said shoulder 53 closely against said lug. When used with a narrower spring eye, filling washers 54, made of any suitable material, may be interposed between the ends of the spring eye and said lugs, around the shackle bolt, so as to prevent side play between the spring eye and casing lugs.

In order to adapt the shackle bolt to spring eyes of different diameters said bolt is constructed and arranged to receive one or more adapter bushings 55, 56 and said bushings are so constructed and arranged with respect to the bolt as to be interlocked thereto so that when an adapter bushing is used the bearing surface for engagement with the spring eye is formed on the exterior surface of the bushing. The said bushings are made of the same length as the bearing portion of the bolt and bear at one end against the shoulder 44, the inner face of which shoulder is substantially in the plane of the associated casing lug. The other ends of the bushings are adapted to bear against the inner face of the other lug at the opposite side of the device. In order that the lubricating grease may be directed to the bearing surfaces of said bushings, the bushings are provided with apertures 57 adapted to register with the lateral grease passage 51 of the bolt and said openings and passage are maintained in register by an interlocking connection between the bushings and bolt. Such interlocking connection is herein shown as effected by means of a short groove 58 in the screw threaded portion of the bolt adapted to be engaged by lugs 59 formed inwardly from the ends of the bushings. Said bushings may be made of seamless drawn tubes or of welded tubes. It is practicable, however, to form said bushings by a swaging operation without welding the edges thereof together.

In the practical adaptation of my invention to the shock absorber art the diameter of the shackle bolt may be such as to fit the smallest diameter standard spring eye. When the shock absorber is to be used with a spring eye having a larger diameter, one of the adapter bushings 55, 56 is applied over said bolt and interlocked thereto. It will be noted that said bushings are of an internal diameter to fit closely over the gearing portion of the bolt and that the larger diameter bearings are afforded by making the bushing walls progressively thicker. Therefore, a shackle bolt equipped with one of the said bushings differs from the simple bolt only in the diameter of its spring eye bearing surface; and the bushed shackle bolt may be adapted to springs of different widths by the use of the end washers 54 in the same manner as a simple shackle bolt.

In commercial practice the diameter of the simple shackle bolt may be one-half inch and the equipment may include two bushings, one having a five-eighths inch external bearing surface and the other with a three-quarters inch external bearing surface. With this equipment, and by the use of the required number of washers 54, the shackle bolt connection may be adapted to all standard sizes of springs without the necessity of changing the diameter or width of the spring eyes.

A practical advantage of my improved shackle bolt connection lies in the fact that a dealer when ordering a supply of shock absorbers equipped with my improved shackle bolts is not required to specify the dimensions of the springs but is enabled to adapt the shock absorber to all standard size springs with the equipment furnished him by the manufacturer of the shock absorber. Therefore, the dealer is not required to keep a large stock of different sizes of shackle bolts. Another advantage growing out of the use of the shackle bolt herein shown is that lost motion due to wear between the bushing bearing and the spring eye may be readily remedied by replacing the bushing with a perfect one, inasmuch as practically all of the wear is taken by the bushing.

It will be understood that the term "spring eye" herein employed may designate an eye formed in the end of the spring member or an eye formed in the spring hanger to which the spring member is connected by the shock absorber.

The structural details of the illustrated embodiment of the invention are capable of some variation within the spirit and scope of the claims hereto appended, and it is the intent to claim all of inherent novelty shown in the drawings and described in the specification.

I claim as my invention:—

1. In a spring mounting, the combination with spaced lugs to receive therebetween a spring eye, and provided with apertures, one of which is screw-threaded and the other plain, of a shackle bolt extending through said apertures, said bolt provided with an intermediate spring eye bearing and at one end with a screw-threaded portion to engage said screw-threaded aperture and at its other end with an enlarged bearing to engage said plain aperture and to form between the spring eye bearing and said enlarged bearing a shoulder, a bushing removably applied over said bolt between said shoulder and the inner face of the opposite lug, the bolt being further provided exterior to said enlarged bearing with a shouldered portion to engage the outer face of the adjacent lug.

2. In a spring mounting, the combination with spaced lugs to receive therebetween a spring eye, and provided with apertures, one of which is screw-threaded and the other plain, of a shackle bolt extending through said apertures, said bolt provided with an intermediate spring eye bearing and at one end with a screw-threaded portion to engage said screw-threaded aperture and at its other end with an enlarged bearing to engage said plain aperture and to form between the spring eye bearing and said enlarged bearing a shoulder, a bushing removably applied over said bolt between said shoulder and the inner face of the opposite lug, the bolt being further provided exterior to said enlarged bearing with a shouldered portion to engage the outer face of the adjacent lug, and means engaging the screw-threaded end of the bolt to lock it in place.

3. In a spring mounting, the combination with spaced lugs to receive therebetween a spring eye, and provided with apertures, one of which is screw-threaded and the other plain, of a shackle bolt extending through said apertures, said bolt provided with an intermediate spring eye bearing and at one end with a screw-threaded portion to engage said screw-threaded aperture and at its other end with an enlarged bearing to engage said plain aperture and to form between the spring eye bearing and said enlarged bearing a shoulder, a bushing removably applied over said bolt between shoulder and the inner face of the opposite lug, the bolt being further provided exterior to said enlarged bearing with a shouldered portion to engage the outer face of the adjacent lug, said bolt being provided with an axial oil opening connected to a radial opening which opens on the bearing face of the bolt and the bushing provided with an opening adapted to register therewith, and means to non-rotatively interlock the bushing to the bolt while permitting it to be removed endwise therefrom.

4. A shackle bolt for shock absorbers for vehicle springs provided with an exterior spring eye bearing portion and provided near one end with a shouldered portion and provided at its other end with a screw-thread, an adapter bushing fitted over the bearing portion of the bolt, a grease cup at one end of the bolt, the bolt provided with a passage connecting the grease cup with the bearing surface of the bolt, said bushing being provided with an opening adapted to register with the terminal of the grease passage, and non-rotative interlocking connections between the adapter bushing and said bolt.

5. A shackle bolt for shock absorbers for vehicle springs provided with a spring eye bearing, with a shoulder near one end and a screw-thread at the other end, a cylindric bearing exterior to said shoulder of greater diameter than the spring eye bearing, an inwardly facing shoulder exterior to and larger in diameter than the cylindric bearing, and a bushing of an internal diameter to closely fit over the spring eye bearing portion of the bolt and of a length to extend between the first-mentioned shouldered portion of the bolt and the screw-thread thereof.

In testimony that I claim the foregoing as my invention I affix my signature in the presence of two witnesses, this 4th day of August A. D. 1915.

THOMAS I. DUFFY.

Witnesses:
W. L. HALL,
G. E. DOWLE.